United States Patent
Schiewer et al.

(10) Patent No.: US 9,635,812 B2
(45) Date of Patent: May 2, 2017

(54) DRIVE SYSTEM FOR A SELF-PROPELLED HARVESTING MACHINE

(71) Applicant: CLAAS SELBSTFAHRENDE ERNTEMASCHINEN GMBH, Harsewinkel (DE)

(72) Inventors: Stefan Schiewer, Lage (DE); Andreas Krauss, Harsewinkel (DE); Jan Furmaniak, Muenster (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 55 days.

(21) Appl. No.: 14/729,503

(22) Filed: Jun. 3, 2015

(65) Prior Publication Data
US 2015/0351324 A1    Dec. 10, 2015

(30) Foreign Application Priority Data

Jun. 6, 2014 (DE) .......... 10 2014 108 026

(51) Int. Cl.
| | |
|---|---|
| *F16H 37/00* | (2006.01) |
| *A01D 69/00* | (2006.01) |
| *F16H 47/02* | (2006.01) |
| *A01D 69/06* | (2006.01) |
| *A01D 69/03* | (2006.01) |
| *A01D 43/08* | (2006.01) |

(52) U.S. Cl.
CPC ............ *A01D 69/00* (2013.01); *A01D 69/03* (2013.01); *A01D 69/06* (2013.01); *F16H 47/02* (2013.01); *A01D 43/08* (2013.01); *F16H 2047/025* (2013.01); *Y10T 74/19037* (2015.01)

(58) Field of Classification Search
CPC ..... F16D 2500/111; B60K 17/28; B60K 5/08; B60K 17/10; B60K 31/00; A01F 29/14; A01D 69/00
USPC .......................... 74/15.2; 192/48.8; 180/366
See application file for complete search history.

(56) References Cited

U.S. PATENT DOCUMENTS

| | | | | |
|---|---|---|---|---|
| 4,455,812 A | * | 6/1984 | James ..................... | A01D 69/08 192/48.2 |
| 4,738,651 A | * | 4/1988 | Favache .................. | F16H 13/14 474/19 |
| 4,967,863 A | * | 11/1990 | Teijido ................... | A01D 69/00 180/53.1 |
| 5,527,218 A | * | 6/1996 | Van den Bossche ..... | A01D 41/142 460/116 |

(Continued)

FOREIGN PATENT DOCUMENTS

| | | |
|---|---|---|
| DE | 1221480 | 7/1966 |
| DE | 102004042113 | 4/2006 |

(Continued)

*Primary Examiner* — Árpád Fábián-Kovács
(74) *Attorney, Agent, or Firm* — Michael J. Striker

(57) ABSTRACT

A drive system for a self-propelled harvesting machine includes a drive engine, designed as an internal combustion engine, a transfer gearbox driven by the drive engine that includes a first driven pulley which is disposed on a drive shaft for driving at least one drive pulley of a working mechanism using a first belt, and at least one hydraulic pump for driving a further working mechanism. A second output pulley is assigned to the transfer gearbox and drives the at least one hydraulic pump using a second belt.

8 Claims, 4 Drawing Sheets

(56) References Cited

U.S. PATENT DOCUMENTS

| | | | | |
|---|---|---|---|---|
| 6,131,837 A * | 10/2000 | Wanner | ................ | A01D 43/086 241/101.742 |
| 6,247,296 B1 * | 6/2001 | Becker | ................ | A01D 41/142 460/20 |
| 6,604,352 B1 * | 8/2003 | Tyvaert | ................ | A01D 43/086 56/16.4 B |
| 7,874,133 B2 * | 1/2011 | Depestel | ................ | A01D 43/086 56/13.3 |
| 8,276,355 B2 * | 10/2012 | Schafer | ................ | A01D 43/107 56/16.4 R |
| 8,978,796 B2 * | 3/2015 | Gallazzini | ............ | B62D 11/006 180/215 |
| 2003/0159416 A1 * | 8/2003 | Pierce | ................ | A01D 41/142 56/10.2 J |
| 2003/0217538 A1 * | 11/2003 | Pirro | ................ | A01D 43/085 56/16.4 A |
| 2004/0060273 A1 * | 4/2004 | Weber | ................ | A01D 41/1274 56/10.2 R |
| 2005/0181900 A1 * | 8/2005 | Jonckheere | ............ | A01D 69/00 474/117 |
| 2005/0279073 A1 * | 12/2005 | Clauss | ................ | A01D 41/142 56/364 |
| 2006/0191251 A1 * | 8/2006 | Pirro | ................ | A01D 43/085 56/60 |
| 2006/0272496 A1 | 12/2006 | Ohashi | | |
| 2007/0010305 A1 * | 1/2007 | Vogelgesang | ........ | A01D 43/085 460/112 |
| 2007/0026984 A1 * | 2/2007 | Teijido | ................ | A01D 69/06 474/46 |
| 2009/0118695 A1 | 5/2009 | Neftel | | |
| 2010/0186362 A1 * | 7/2010 | Favache | ................ | A01D 43/08 56/16.4 R |
| 2011/0203243 A1 * | 8/2011 | Finkler | ................ | A01D 41/127 56/10.8 |
| 2011/0246030 A1 * | 10/2011 | Jueptner | ................ | A01D 69/00 701/50 |
| 2012/0067037 A1 * | 3/2012 | Bohrer | ................ | A01D 75/187 60/450 |
| 2014/0148286 A1 * | 5/2014 | Murray | ................ | A01D 69/08 474/76 |
| 2014/0155212 A1 * | 6/2014 | Kato | ................ | F16H 47/04 475/59 |
| 2014/0298766 A1 * | 10/2014 | Furmaniak | ............ | A01F 12/56 56/14.6 |
| 2015/0342119 A1 * | 12/2015 | Duquesne | ............ | A01F 12/38 700/280 |
| 2015/0351323 A1 * | 12/2015 | Schiewer | ............ | A01D 69/002 74/15.2 |
| 2016/0238118 A1 * | 8/2016 | Kato | ................ | A01D 69/03 |

FOREIGN PATENT DOCUMENTS

| | | | | |
|---|---|---|---|---|
| DE | 102009028056 | | 2/2010 | |
| EP | 1875793 | | 1/2008 | |
| EP | 1875933 | | 1/2008 | |
| GB | 703617 | | 2/1954 | |
| JP | 2011069416 A | * | 4/2011 | ............ F16H 61/04 |
| WO | WO 2008/053607 | | 5/2008 | |
| WO | WO 2013/018696 | | 2/2013 | |

* cited by examiner

DRIVE SYSTEM FOR A SELF-PROPELLED HARVESTING MACHINE

CROSS-REFERENCE TO A RELATED APPLICATION

The invention described and claimed hereinbelow is also described in German Patent Application DE 10 2014 108 026.2, filed on Jun. 6, 2014. The German Patent Application, the subject matter of which is incorporated herein by reference, provides the basis for a claim of priority of invention under 35 U.S.C. 119(a)-(d).

BACKGROUND OF THE INVENTION

The present invention broadly to a drive system for a self-propelled harvesting machine comprising a drive engine, such as an internal combustion engine, a transfer gearbox that is driven by the drive engine and which comprises a first driven pulley that is disposed on a drive shaft and drives at least one drive pulley of a working mechanism by a drive belt.

Document EP 1 875 933 A1 makes known a self-propelled harvesting machine designed as a forage harvester with a front attachment for picking up crop and an intake conveyor mechanism to feed crop that has been picked up by the front attachment to a chopper unit of the forage harvester. The chopper unit is disposed downstream of the intake conveyor mechanism and comprises a cutting cylinder that is driven by a drive shaft. The forage harvester has a drive system with a transfer gearbox, which has a driven pulley and is driven by an internal combustion engine. A drive belt designed as a main belt is wrapped around the driven pulley and, inter alia, drives the chopper unit and a hydraulic pump, which is used to drive the intake conveyor mechanism. The front attachment is driven by a primary transmission, which is assigned to the drive shaft of the cutting cylinder.

A disadvantage of the known drive system has proven to be that the drive of the hydraulic pump by the main belt, which requires a high drive speed, is carried out by a pump drive pulley having a small diameter. This results not only in the load caused by the drive of the hydraulic pump per se, but also in an additional load due to increased wear on the main belt.

SUMMARY OF THE INVENTION

The present invention overcomes the shortcomings of known arts, such as those mentioned above.

To that end, the present invention provides a drive system for a self-propelled harvesting machine and a self-propelled forage harvester comprising such a drive system. The drive system for the self-propelled harvesting machine comprises a drive engine, such as an internal combustion engine, a transfer gearbox, which is driven by the drive engine and which comprises a first driven pulley disposed on a drive shaft for driving at least one drive pulley of a working mechanism by a first drive belt, at least one hydraulic pump for driving at least one further working mechanism, wherein the transfer gearbox is drivably connected to the at least one hydraulic pump by a second drive belt, such that the service life of the drive belt, e.g., at least the first drive belt, is extended.

There is a split, therefore, of the drive system, into a main drive train, which comprises directly mechanically driven working mechanisms and an auxiliary drive train, which comprises hydraulically driven working mechanisms. The first driven pulley, the at least one drive pulley and the first belt form a main drive train. The at least one first driven pulley that drives the at least on hydraulic pump and the second belt form an auxiliary drive train.

The first driven pulley can have a width that corresponds to the belt widths of the first and the second belts, thereby enabling the first belt and the second belt to wrap around the at least one first driven pulley. Due to the split into a main drive train and an auxiliary drive train proceeding from the transfer gearbox, the power to be transferred in the main drive train by the first belt is reduced as compared to the drive system according to the prior art, in which the hydraulic pump is also integrated.

In addition, the influence on the first belt by the pulley for the at least one hydraulic pump, which is driven at high speed, is eliminated using the inventive drive system. That is, a second driven pulley is assigned to the transfer gearbox in order to drive the at least one first hydraulic pump by the second belt.

Such a configuration is advantageous in that the axial loads in the main drive are reduced and, a load change in the main drive train does not occur during braking.

The second driven pulley is disposed parallel to the first driven pulley. Preferably, the second driven pulley is disposed so as to be coaxial with the first driven pulley. The second driven pulley can be disposed on a common output shaft of the transfer gearbox, which makes it possible to make good use of the available installation space.

Preferably, the second belt (via the second driven pulley) drives a first hydraulic pump for driving the front attachment and a second hydraulic pump for driving the intake conveyor mechanism. The separation of the drives for the front attachment and the intake conveyor mechanism from the main drive has the advantage that the power to be transferred in the main drive train is reduced.

In a development, the first hydraulic pump and the second hydraulic pump are designed as a tandem pump, which tandem pump is driven by a common first pump drive pulley.

Moreover, the second belt (via the second driven pulley) drives a second pump drive pulley for driving a third hydraulic pump, which is used to drive a hydraulic pick-up drive of a front attachment designed as a pick-up. The second pump drive pulley has the advantage that it contributes to better guidance of the second belt.

To this end, the second pump drive pulley can be engaged by a clutch. The clutch provides the advantage that the drive power of the third pump is available only as needed, i.e., when a pick-up, as the front attachment, is coupled to the intake conveyor mechanism of the agricultural harvesting machine. In all other cases, the second pump drive pulley is decoupled from the second belt by actuating the clutch accordingly, thereby reducing the drive power that is required.

Preferably, the first pump, the second pump and the third pump are disposed on a common support, simplifying installation and maintenance.

BRIEF DESCRIPTION OF THE DRAWINGS

Further features and advantages of the invention will become apparent from the description of embodiments that follows, with reference to the attached figures, wherein.

DETAILED DESCRIPTION OF THE
PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
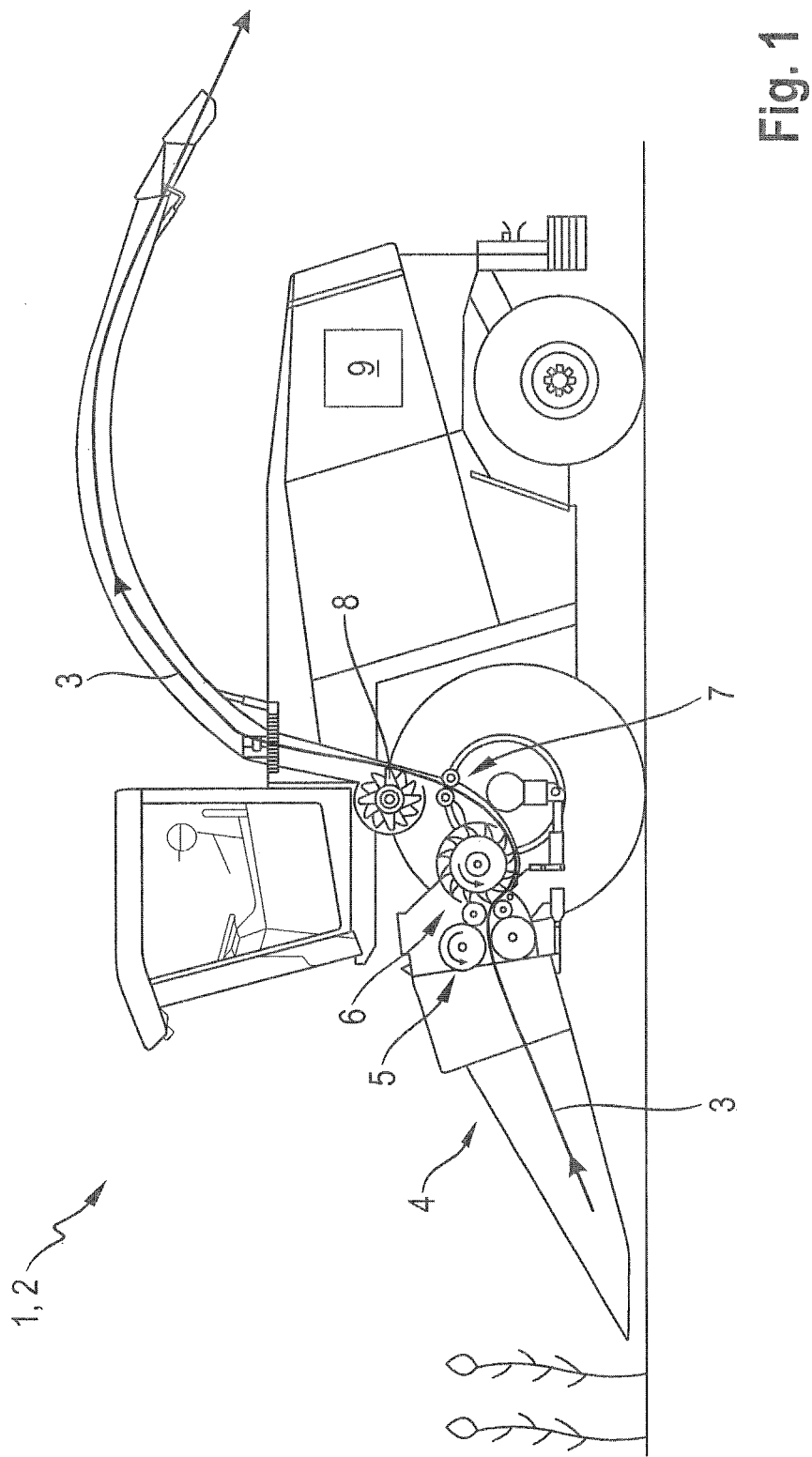
FIG. 1 depicts a schematic view of a self-propelled harvesting machine.

FIG. 1 depicts a schematic side view of a self-propelled harvesting machine 1, which is designed as a forage harvester 2, during harvesting on the field. The forage harvester 2 harvests or picks up plants from the field by a front attachment 4 in order to convey the picked-up crop 3, in the form of a crop stream (indicated in FIG. 1 as a line with arrows), through working mechanisms. The working mechanisms are designed as processing and conveying mechanisms of the forage harvester 2 and discharge the crop by a transfer device into a loading container, which is not shown.

The processing and conveying mechanisms of the forage harvester 2 comprise, inter alia, an intake conveyor mechanism 5, which comprises a plurality of roller pairs disposed one behind the other in a feeder housing, a chopper unit 6 that chops the crop using a rotating cutting cylinder equipped with knives in cooperation with a shear bar, a conditioning device 7 disposed downstream of the chopper unit 6 in a conveyor chute in the direction of crop flow and a discharge accelerator 8. The discharge accelerator 8 is disposed downstream of the conditioning device 7 in the conveyor chute in the direction of crop flow and accelerates the crop 3 using rotating paddles to ensure reliable discharge thereof through the transfer device. The front attachment 4, the intake conveyor mechanism 5, the chopper unit 6, the conditioning device 7 and the discharge accelerator 8 are referred to in the following as working mechanisms. An internal combustion engine 9 is disposed in the rear of the forage harvester 2, which is used to drive the aforementioned working mechanisms 4, 5, 6, 7, 8 of the forage harvester 2.

Figure 2:
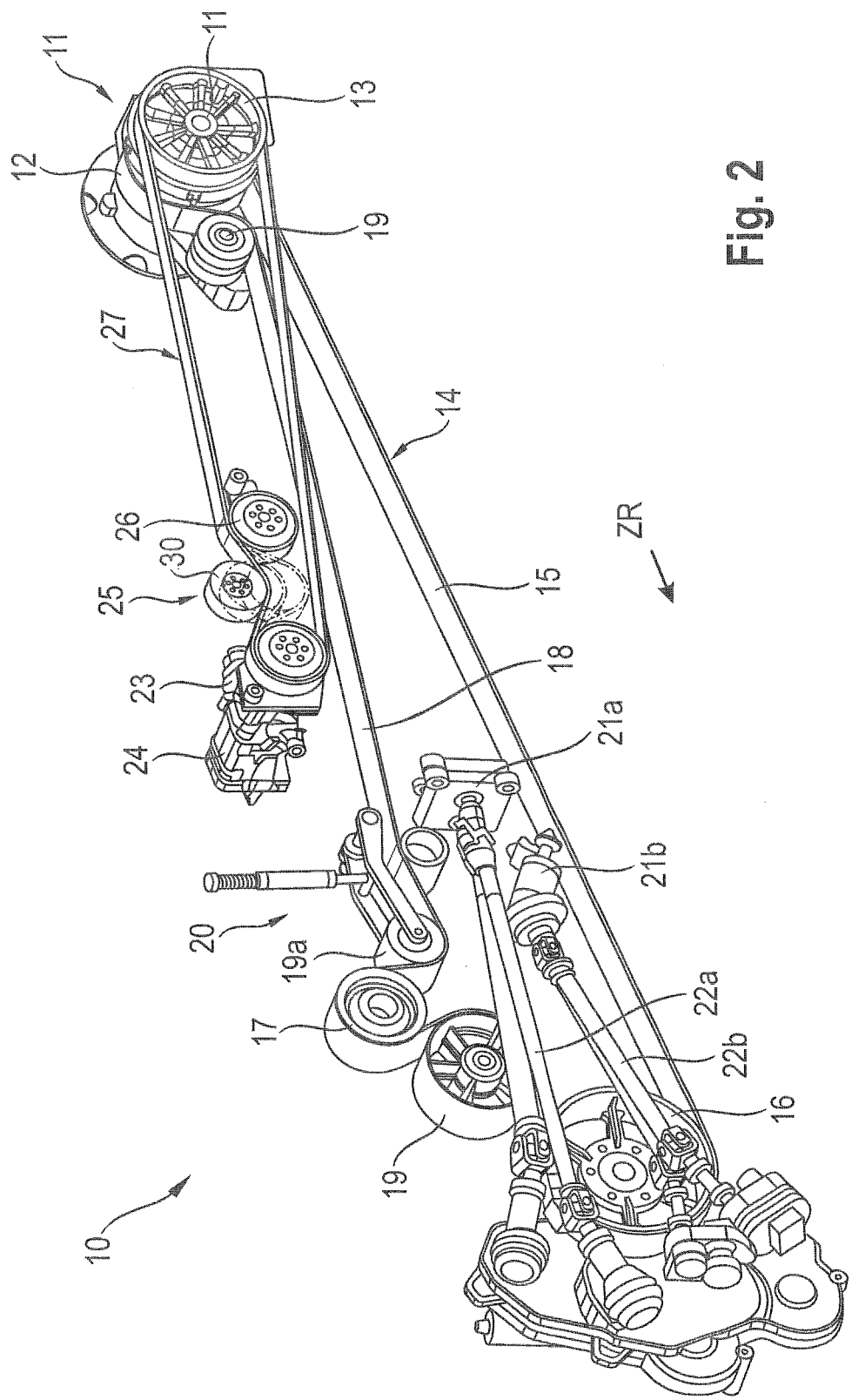
FIG. 2 depicts a schematic view of a drive system of the harvesting machine according to FIG. 1.
Figure 3:
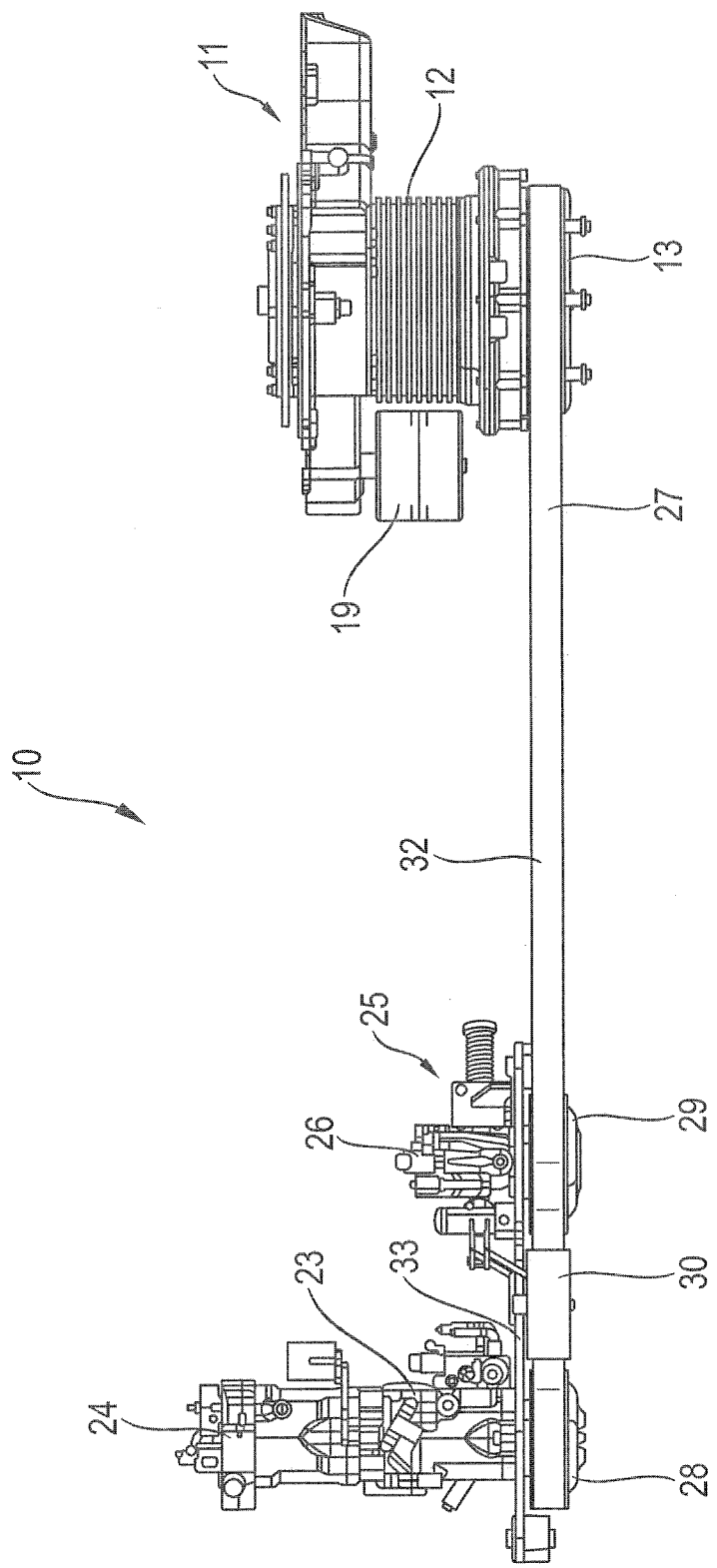
FIG. 3 depicts a schematic partial view of the drive system according to FIG. 2, from above.

FIG. 2 shows a schematic view of a drive system 10 constructed according to the inventive principles, which is included in the harvesting machine 1, i.e., the forage harvester 2. The internal combustion engine 9 drives a transfer gearbox 11 by via an output shaft. The transfer gearbox 11 comprises a first driven pulley 12 and a second driven pulley 13, as shown in greater detail in FIG. 3, which shows a schematic partial view of the drive system 10 according to FIG. 2 from above.

The first driven pulley 12 and the second driven pulley 13 are disposed coaxially relative to one another on an output shaft of the transfer gearbox 11. The first driven pulley 12 is wrapped around by a first belt 14, which wraps around a first drive pulley 16, which is used to drive the chopper unit 6. A guider roller 19 and a second drive pulley 17 are disposed downstream of the first drive pulley 16. The first driven pulley 12, the first drive pulley 16 of the chopper unit 6, the second drive pulley 17 of the downstream discharge accelerator 8, and the first belt 14 form a main drive train. The main drive chain is used to directly mechanically drive the working mechanisms disposed downstream of the chopper unit 5 in the direction of crop flow, as well as the conditioning device 7 and the discharge accelerator 8.

A so-called load side 15 extends between the first driven pulley 12 and the first drive pulley 16 of the chopper unit 6. The pulling direction is indicated by an arrow labeled "ZR". The downstream discharge accelerator 8 is driven by the second drive pulley 17. A slack side 18 extends above the load side 15. The first belt 14 is guided and the belt tension that is required to transfer the drive power from the transfer gearbox 11 to the working mechanisms 4, 5, 6, 7, 8 is applied using a guide roller 19 and a tensioning device 20, which acts on the first belt 14 by means of a jockey pulley 19a.

The working mechanisms disposed upstream of the chopper unit 6 in the direction of crop flow, the front attachment 4 and the intake conveyor mechanism 5 are driven by separate hydrostatic motors 21a and 21b, on the output shafts of which a universal drive shaft 22a and 22b, respectively, are disposed for transferring the torque to the front attachment 4 and the intake conveyor mechanism 5, respectively.

The hydrostatic motor 21a of the intake conveyor mechanism 5 and the hydrostatic motor 21b of the front attachment 4 are supplied by a first hydraulic pump 23 and a second hydraulic pump 24, respectively, which are connected thereto by a (non-illustrated) hydraulic line. As indicated in FIG. 2, and as clearly shown in FIG. 3, the first hydraulic pump 23 and the second hydraulic pump 24 are designed as a so-called tandem pump.

The first hydraulic pump 23 is drivably connected via the drive shaft thereof to the first pump drive pulley 28. The power transferred by the drive shaft of the first hydraulic pump 23 is used, in part, to drive the hydraulic motor 21a of the intake conveyor mechanism 5, and, for the other part, the transferred power is used to drive the second hydraulic pump 24, which supplies the hydrostatic motor 21b of the front attachment 4.

The second hydraulic pump 24, which supplies the hydrostatic motor 21a of the intake conveyor mechanism 5, must be disposed on the side facing away from the first pump drive pulley 28 in order to ensure that the intake conveyor mechanism 5 can be halted immediately in the event that a foreign object is detected therein. This is carried out by interrupting the conveyance of hydraulic oil from the second hydraulic pump 24 to the hydrostatic motor 21b using a control valve arrangement on the hydrostatic motor 21b.

Figure 4:
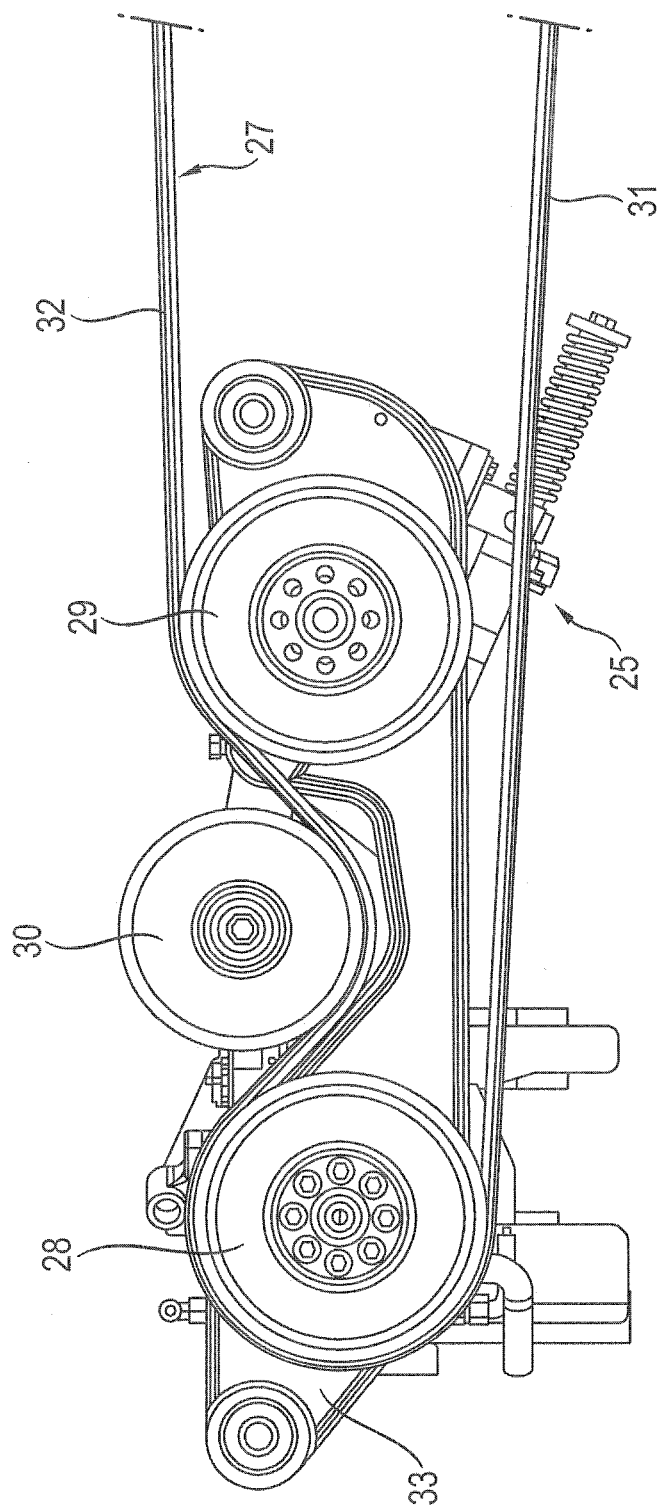
FIG. 4 depicts a schematic partial view of the drive system according to FIG. 3, from the side.

The first hydraulic pump 23 and the second hydraulic pump 24 are driven by a belt drive, which comprises a second belt 27, which is wrapped around the second driven pulley 13 and the first pump drive pulley 28 and a second pump drive pulley 29, as shown in the depiction according to FIG. 4. FIG. 4 shows a schematic partial view of the drive system according to FIG. 3 from the side. The second driven pulley 13, the first pump drive pulley 28 and the second pump drive pulley 29 form an auxiliary drive train, which is used to drive at least the first and the second hydraulic pump 23 and 24.

The auxiliary drive train is designed similarly to the configuration of the main drive train, i.e., the load side 31 extends underneath the slack side 32. The second pump drive pulley 29 is disposed downstream of the first pump drive pulley 28. The second pump drive pulley 29 drives a third hydraulic pump 26. A jockey pulley 30, which is coupled to the tensioning device 25, is disposed between the first pump drive pulley 28 and the second pump drive pulley

29. The first hydraulic pump 23, the second hydraulic pump 24, and the third hydraulic pump 26 are disposed on a common support 33.

As shown, the third hydraulic pump 26 is used to drive a hydraulic pick-up drive of a front attachment 4 designed as a pick-up. Therefore, the third hydraulic pump 26 only needs to be operated when the forage harvester is operated with a pick-up as the installed front attachment. In order to minimize the power uptake in the auxiliary drive train, the third hydraulic pump 26 can be decoupled from the auxiliary drive train by a clutch between the drive shaft of the third hydraulic pump 26 and the second pump drive pulley 29. As an alternative, the third hydraulic pump 26 can be used to drive components of a front attachment designed as a grain-cutting device, which can be coupled to the forage harvester 2.

LIST OF REFERENCE SIGNS

1 harvesting machine
2 forage harvester
3 crop
4 front attachment
5 intake conveyor mechanism
6 chopper unit
7 conditioning device
8 discharge accelerator
9 internal combustion engine
10 drive system
11 transfer gearbox
12 first driven pulley
13 second driven pulley
14 first belt
15 load side
16 first drive pulley
17 second drive pulley
18 slack side
19 guide roller
19*a* jockey pulley
20 tensioning device
21*a* hydrostatic motor
21*b* hydrostatic motor
22*a* universal drive shaft
22*b* universal drive shaft
23 first hydraulic pump
24 second hydraulic pump
25 tensioning device
26 third hydraulic pump
27 second belt
28 first pump drive pulley
29 second pump drive pulley
30 guide roller
31 load side
32 slack side
33 support As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A drive system for a self-propelled harvesting machine, comprising:
    a drive engine designed as an internal combustion engine;
    a transfer gearbox that is driven by the drive engine; and
    a first and a second hydraulic pump;
    a main drive train that comprises mechanically driven working mechanisms; and
    an auxiliary drive train that comprises hydraulically driven working mechanisms;
    wherein the transfer gearbox comprises a first driven pulley, that is disposed on a drive shaft and that directly drives the mechanically driven working mechanisms of the main drive train by a first belt, and a second driven pulley that is drivably connected to the first hydraulic pump and the second hydraulic pump by a second belt, and
    wherein the first hydraulic pump drives a first one of the hydraulically working mechanisms and the second hydraulic pump drives a second one of the hydraulically driven working mechanisms.

2. The drive system according to claim 1, wherein the second driven pulley is disposed parallel to the first driven pulley.

3. The drive system according to claim 1, wherein the first hydraulic pump and the second hydraulic pump of the auxiliary drive train are designed as a tandem pump and wherein the tandem pump is driven by a common first pump drive pulley by the second belt.

4. A forage harvester comprising a drive system according to claim 1.

5. The drive system according to claim 1, wherein the first one of the hydraulic working mechanisms of the auxiliary drive train is a front attachment and the second one of the hydraulic working mechanisms of the auxiliary drive train is an intake conveyor mechanism.

6. The drive system according to claim 5, wherein the second belt drives a second pump drive pulley for driving a third hydraulic pump that is used to drive a hydraulic pick-up drive of the front attachment, and wherein the front attachment is designed as a pick-up.

7. The drive system according to claim 6, wherein the second pump drive pulley is engaged using a clutch.

8. The drive system according to claim 7, wherein the first hydraulic pump, the second hydraulic pump and the third hydraulic pump are disposed on a common support.

* * * * *